United States Patent [19]
Vierling et al.

[11] 3,777,081
[45] Dec. 4, 1973

[54] METHOD FOR MEASURING THE FREQUENCY-DEPENDENT ATTENUATION OF A TELECOMMUNICATIONS LINE, ESPECIALLY A TWO-WIRE LINE

[75] Inventors: Oskar Vierling, Ebermannstadt; Hansjurgen Wieland, Darmstadt, both of Germany

[73] Assignee: said Vierling, by said Wieland

[22] Filed: Dec. 14, 1971

[21] Appl. No.: 207,860

[30] Foreign Application Priority Data
Jan. 20, 1971  Germany.................. P 21 02 511.6

[52] U.S. Cl. ............................................. 179/175.3
[51] Int. Cl. ............................................. H04b 3/46
[58] Field of Search................ 179/175.3, 175.31 R; 324/58 A; 328/162

[56] References Cited
UNITED STATES PATENTS
| | | | |
|---|---|---|---|
| 2,666,099 | 1/1954 | Bonner | 179/175.3 |
| 1,913,495 | 6/1933 | Matte | 179/175.3 |
| 3,655,915 | 4/1972 | Liberman et al. | 179/175.3 |
| 3,617,657 | 11/1971 | Brewer | 179/175.31 R |
| 3,295,022 | 12/1966 | Schelisch | 324/58 A |
| 2,953,743 | 9/1960 | Desoer | 179/175.3 |

FOREIGN PATENTS OR APPLICATIONS
1,900,709  8/1970  Germany ......................... 179/175.3

Primary Examiner—Kathleen H. Claffy
Assistant Examiner—Douglas W. Olms
Attorney—Edwin E. Griegg

[57] ABSTRACT

A method for measuring the frequency-dependent attenuation of a telecommunications line, especially a two-wire line, in both traffic directions, from one line end. The attenuation of the line is determined by modulation of the voltages at a measurement station with one or more carrier frequencies and transmitting the modulated voltages to another station via the line to be measured where the voltages are demodulated and converted while retaining their frequency into constant-level voltages. The constant-level voltages are transmitted via the line to be measured to the measurement station.

9 Claims, 1 Drawing Figure

PATENTED DEC 4 1973 3,777,081
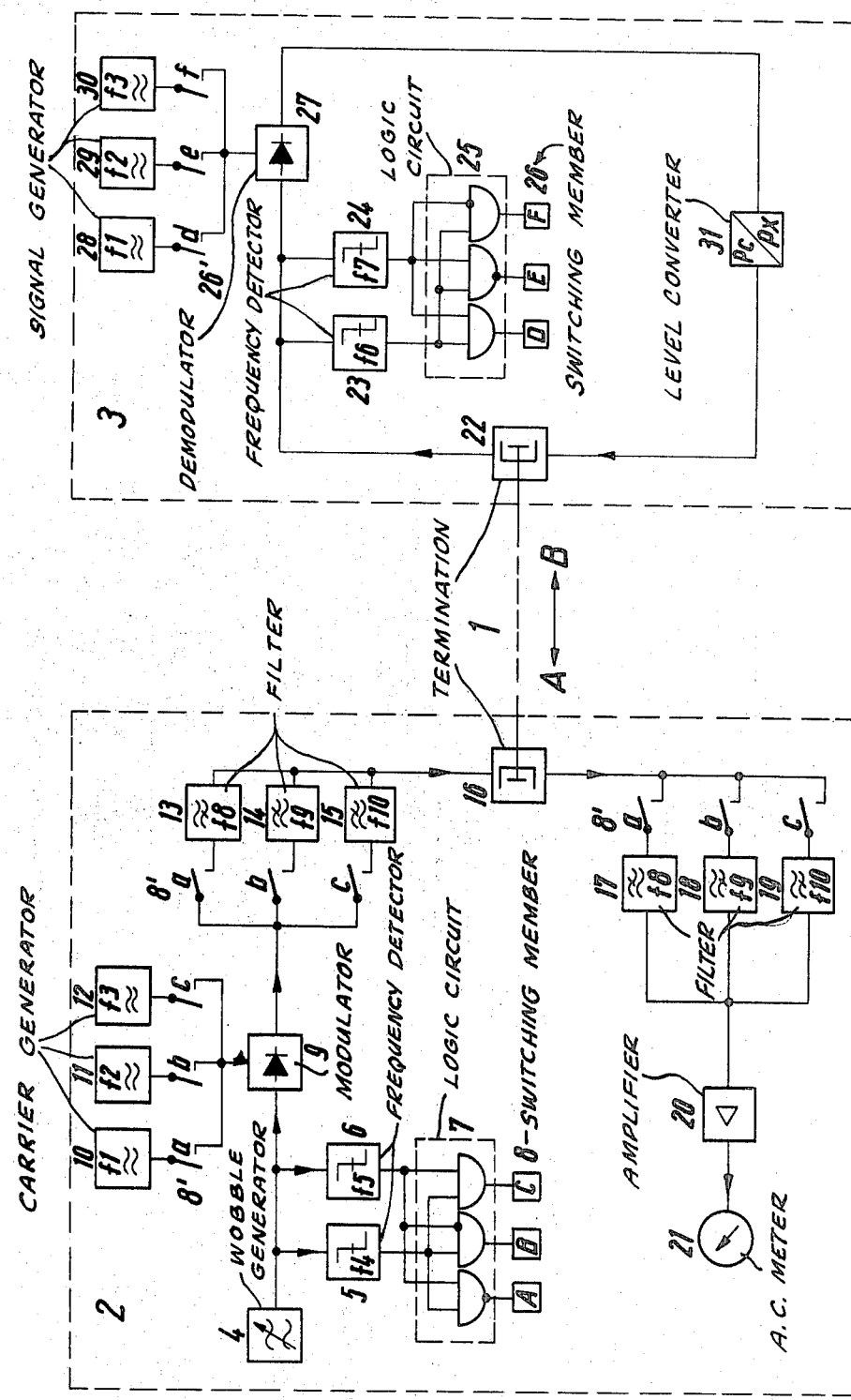

METHOD FOR MEASURING THE FREQUENCY-DEPENDENT ATTENUATION OF A TELECOMMUNICATIONS LINE, ESPECIALLY A TWO-WIRE LINE

BACKGROUND OF THE INVENTION

It is known that the attenuation of telecommunications lines, in both traffic directions, can be measured from one end of the line. The frequency-dependent attenuation of the line, in the direction from the measurement point to the opposite point referred to as the counterpoint, is determined by converting the measurement voltages of varying frequency. The measurement voltages are transmitted from the measurement point via the line to be tested to the opposite point and are converted either into voltages having a certain frequency, with a level corresponding to the level of the particular reception voltage or into voltages of any desired level, with a frequency associated with the level of the particular reception voltage. These voltages are then transmitted via a line to the measurement point. The frequency-dependent attenuation of the line in the direction from the opposite station to the measurement station is determined. To this end measurement voltages of varying frequency, which are transmitted from the measurement station via a line to the opposite station, are converted, in the opposite station, into voltages of corresponding frequencies, but constant level. The converted voltages are transmitted via the line to be tested to the measurement station. Such an arrangement is shown in German Published Application DAS No. 1,216,372. With this method, which can be applied primarily to four-wire lines, one can also measure two-wire lines, if one connects two such two-wire lines and if one first operates one of them in the direction from the measurement station to the opposite station and the other one in the direction from the opposite station to the measurement station in order then to switch the traffic direction around.

As should be apparent, the connection and the switching of two lines, each time, results in complications and increased expenditures in terms of switching and exchange technology. The object of the invention therefore is to provide a way for measuring a two-wire line, separately, for itself, in both traffic directions, from one line end, without simultaneously having to connect in additional lines.

For two-wire lines, a method has been proposed according to which measurement voltages of differing frequency, which are transmitted from a measurement station for the purpose of measuring in the direction from the measurement station to the opposite station, are converted in the opposite station into voltages with a different frequency, the voltages in each case having an amplitude, frequency, phase, or frequency spectrum corresponding to the amplitude of the measurement voltage received in each case at the opposite station and which are transmitted, via the line to be measured, to the measurement station. At this point they are separated from the transmission voltages by means of frequency-dependent members.

For measurement in the direction from the opposite station to the measurement station, this method requires that a fixed-frequency or wobble generator be present in the opposite station. The generator is connected to the distant line end and is changed over to the measurement frequencies by means of a remote-controlled network controlled from the measurement station. This kind of remote control has the disadvantage that every change in the measurement frequency requires a separate control command or direction order. Individual measurements for various frequencies are time-consuming and awkward, particularly where measurements must be accurate and errors limited. Furthermore, expensive control means are necessary and stringent design requirements are set up to maintain the frequency constancy of the generator in the opposite station.

BRIEF DESCRIPTION OF THE INVENTION

It is the object of the invention to carry out the measurement in a two-wire line in the direction from the opposite station to the measurement station in a simple and reliable manner and without the above-mentioned disadvantages.

This object is achieved in accordance with the invention in that the attenuation of the line in the direction from the opposite station to the measurement station is determined in the following manner: the measurement voltages are modulated in the measurement station with one or more carrier frequencies and are transmitted via the line to be measured to the opposite station. At the opposite station the modulated voltages are demodulated and converted, retaining their frequency, into constant-level voltages. These voltages are transmitted via the line to be measured to the measurement station. The measurement station can thus freely determine for what duration the opposite station is to transmit which measurement frequencies.

In each case, the modulated voltages are transmitted in the direction from the measurement station to the opposite station and the demodulated voltages are transmitted in the direction from the opposite station to the measurement station. It is therefore possible simultaneously to control the voltages to be given off by the opposite station and to receive the measurement values. The carrier frequency for modulation could in itself be a fixed frequency or a frequency which is obtained from the particular measurement frequency by means of a constant or relative amount of frequency shift. Particularly favorable conditions are achieved if the frequency band is subdivided into two or more sectors, to each of which a separate carrier frequency is associated. Basically it is possible to work with two sectors, provided filters having frequency characteristics with steep slopes providing well defined cut off points are used for the separation of the transmitting and reception frequencies. In order to be able to get along with less steep filters, another embodiment of the invention proposes that the frequency bands of the measurement voltages be subdivided into at least three sectors. To each sector there is associated a carrier frequency so far above or below the particular sector that at least one side band of the modulation product will be outside the sector mentioned.

The particular correct modulation product is guaranteed, according to another embodiment of the invention, wherein selection of the carrier frequencies in the measurement station is accomplished by means of frequency detectors as a function of the frequency of the measurement voltages.

The demodulator frequencies in the opposite station could be switched over by means of remote control. In one advantageous further embodiment of the invention, the selection of the demodulator frequencies takes place in the opposite station by means of frequency detectors as a function of the frequency of the reception voltages.

The connection of the generators for modulation and demodulation is accomplished in a simple manner. In a preferred embodiment of the invention, the frequency detectors control switching means via logic switching circuits for the selection of the carrier and demodulator frequencies. Moreover, in an improvement of the invention, the transmission voltages are separated from the reception voltages by means of frequency-dependent members which are turned on via switching elements as a function of the frequency of the measurement voltages. In this way such portions of the transmission voltage, which could otherwise reach the reception side, even if there were a hybrid termination at this end of the line — because a termination has only a finite transition attenuation — are prevented from falsifying the measurement result.

In the opposite station, the separation is normally accomplished by means of a hybrid termination at the other end of the line. If there is none there or if its transition attenuation has a smaller value than usual, then there are provided means by which in the opposite station the transmission voltages are separated from the reception voltages by frequency-dependent members which can be turned on via switching elements as a function of the frequency of the reception voltages.

In general, only one of the side bands developed during modulation is used for the purpose of transmitting in the direction from the measurement station to the opposite station. The measurement station may contain frequency-dependent members which keep undesirable modulation products away from the line to be tested.

SUMMARY OF THE INVENTION

The invention offers the following advantages: every two-wire line can be measured by itself, regardless of whether or not it is equipped with terminations on both sides and regardless of the properties of the terminations. The measurement duration and the particular measurement frequency are determined from the measurement station. Simultaneously with the adjustment of the measurement frequency, a measurement value is obtained so that, in addition to wobble measurements, measurements with discreet frequencies can be made.

BRIEF DESCRIPTION OF THE DRAWING

In the FIGURE there is shown a diagrammatic block diagram of the invention to which reference may be made in combination with the following description for a fuller understanding of the invention.

DESCRIPTION OF THE PREFERRED EMBODIMENTS

The single FIGURE shows the line to be measured 1, which connects an exchange equipped with a measurement station 2, for example, a main exchange, with an unoccupied opposite station 3, for example, a terminal exchange. Line 1 can, at opposite ends A and B, be provided with terminations 16 and 22, respectively, which separate the incoming and outgoing directions as shown by the arrows. The terminations generally form part of the line and are measured together with it. The method involved in the invention, however, as will be hereinafter explained, is not tied to the presence of terminations which may be two-wire or four-wire terminating sets or hybrid sets.

Measurement station 2 contains a fixed-frequency or wobble generator 4 and a spectrally resolving alternating voltage measurement instrument 21 which may be, for example, a level image unit. A switching member 8 is activated via frequency detectors 5 and 6 and a logic connection circuit 7 as a function of the frequency of generator 4. Connected to the output of generator 4 is a modulator 9 which modulates the generator output voltage with, in each case, one of three carrier frequencies $f_1$ to $f_3$. The carrier frequencies are supplied by three respective fixed frequency generators 10, 11 and 12. The selection of the carrier frequencies is made by the switching member 8 via switching element 8' which may be, for example, a separate set of contacts provided by the switching member.

The output of modulator 9 is connected with the switchable frequency-dependent members 13–15, here illustrated as three filters 13–15. The filters 13–15 can be selectively connected to the output of modulator 9 by switching member 8 via corresponding switching elements 8'. Advantageously, these filters in each case allow only one side band of the modulator oscillations to pass to line 1. At the reception side of station 2, frequency-dependent members 17–19 are provided. Members 17–19 are connected to termination 16 by means of switching elements 8' corresponding to a third set of contacts of member 8. Filters 17–19 are provided to separate the transmitting from the reception voltages, because even if there is a termination 16 at line end A, portions of the transmission voltage could still pass to the reception side in the absence of the filters because of the finite transition attenuation of the termination. An amplifier 20 is connected to the output of filters 17–19. This amplifier balances out the fundamental attenuation of the filters. Measurement instrument 21 is connected to it.

The opposite station 3 contains two frequency detectors 23 and 24 which control a switching member 26 via a logic connection circuit 25 as a function of the frequency of the reception voltage. This switching member 25 connects a demodulator 27, via switching elements 26', shown as a set of contacts, with one, each, of three generators 28–30 corresponding to the demodulator frequencies. The output of demodulator 27 is connected with a level converter 31 which converts incoming voltages of varying level into voltages of constant level while retaining their original frequency, much like a regulating amplifier. If there is no termination 22 at line end B, a separating filter controlled by the converter 31 or the switching member 8 may be utilized. Likewise, it is possible to provide, in connection with converter 31, three filters having the properties of the filters 17–19 of measurement station 2 arranged to be turned on by switching member 26 via an additional set of switching elements 26'.

To give a numerical example, we assume that the measurement frequency range is 0.2–3.5 Kc. Also we assume that generator 10 generates a carrier frequency $f_1$ of 2 Kc, generator 11 a carrier frequency of 2.8 Kc and generator 12 a carrier frequency of 4.8 Kc, and the same frequencies are supplied by generators 28–30 in the opposite station 3. Frequency detector 5 which, for example, can be a frequency discriminator, gives off an output signal if the frequency of generator 4 is above a frequency $f_4$ of 1.5 Kc, while frequency detector 6 supplies an output signal above a frequency $f_5$ of 2.6 Kc. Filter 13 is a high-pass or pass band filter which lets frequencies above the frequency $f_8$, from 2 Kc up to about 4 Kc, pass through. Filter 14 is a low-pass filter which allows the passage of frequencies below a frequency $f_9$ of 1.4 Kc and likewise filter 15 is a low-pass filter for frequencies below a frequency $f_{10}$ of 2.4 Kc. Filters 17–19 are complementary with respect to filters 13–15; the low-pass filter 17 allows the passage of frequencies below $f_8$ of 2 Kc, the high-pass filter 18 allows the passage of frequencies above $f_9$ of 1.4 Kc, and the high-pass filter 19 allows the passage of frequencies above $f_{10}$ of 2.4 Kc.

In the opposite station, the frequency detector 23 responds when a frequency $f_6$ of 1.3 Kc is exceeded and frequency detector 24 responds when a frequency $f_7$ of 2.2 Kc is exceeded. If filters are provided at the output of the converter 31, the same boundary frequencies apply to them as to the filters 17–19 in measurement station 2.

If a measurement voltage in the range between 0.2 and 1.5 Kc is adjusted in measurement station 2 at generator 4, then both frequency detectors 5 and 6 will not give off any output signal. Phase A of the switching member 8 will be activated via the logic connection circuit 7. In this way, all a-contacts of each set of the switching elements 8' will close and will connect the modulator 9 with generator 10 as well as with filter 13 and connect the output of 13 through termination 16 with filter 17. The measurement voltage in the range from 0.2 – 1.5 Kc is now modulated with 2 Kc ($f_1$) and there is obtained one, each, voltage in the bands 1.8 – 0.5 Kc as well as 2.2 – 3.5 Kc. The lower band is blocked by the high-pass or pass-band filter 13; consequently, only the voltage, which lies in the range between 2.2 and 3.5 Kc, gets to line 1 as transmission voltage. It is received at line end B and there it causes both frequency detectors 23 and 24 to give off one output signal, each. As a result, phase D of switching member 26 is activated and it closes the corresponding contact 26', in this case, the d-contact. As a result, generator 28, with frequency $f_1$ amounting to 2 Kc, is connected to the demodulator 27. The reception voltage in the range of 2.2 – 3.5 Kc is demodulated by demodulator 27 and a measurement frequency voltage in the range between 0.2 and 1.5 Kc is obtained. This voltage is brought to a constant level, preferably, corresponding to the usual measurement level of −4 db by means of converter 31, while retaining its frequency. The output of the converter is transmitted via the line to be measured 1 to the measurement station 2. From there it gets to measurement instrument 21 via the low-pass filter 17 and the amplifier 20.

If the measurement frequency is in the range between 1.5 and 2.6 Kc, frequency detector 5 will respond, but not detector 6. Its output signal confirms phase B of the switching member 8, whereupon all b-contacts close. As a result, generator 11 and low-pass filter 14 are connected to modulator 9. The carrier frequency now is 2.8 Kc and we get one, each, voltage in the bands from 1.3 to 0.2 Kc, as well as from 4.3 to 5.4 Kc. Of these, filter 14 allows the passage of only the voltage in the lower side band, from 1.3 to 0.2 Kc. Via line 1 this voltage gets to the opposite station 3 but does not produce an output signal on either of the two frequency detectors 23 and 24. Thus, phase E of the switching member 26 is now activated via logic connection circuit 25 and the e-contact is closed. This contact connects the generator 29, with frequency $f_2$ amounting to 2.8 Kc, with demodulator 27. At the output of demodulator 27 we now once again get a measurement frequency voltage in the range between 1.5 and 2.6 Kc which is brought to a constant level by converter 31. This signal is transmitted to measurement station 2 via line 1 and through the now effective high-pass filter 18 to the measurement instrument 21 via amplifier 20.

If the measurement frequency is in the range between 2.6 and 3.5 Kc, both frequency detectors 5 and 6 give off an output signal. As a result of this, phase C of the switching member 8 is activated via the logic circuit 7 and closes all c-contacts. Now generator 12 is connected with modulator 9 and supplies a carrier frequency $f_3$ amounting to 4.8 Kc. One, each, voltage is obtained in the range between 2.2 and 1.3 Kc and in the range from 7.4 to 8.3 Kc. Low-pass filter 15 allows the passage of only the lower side band from 2.2 to 1.3 Kc. The transmission voltage, which is located in this range, is transmitted via line 1 to the opposite station 2 and generates an output signal at frequency detector 23. Frequency detector 24 does not respond. Phase F of the switching member 8 is now activated via logic circuit 25 and via the f-contact, it connects generator 30, which has frequency $f_3$ amounting to 4.8 Kc, with demodulator 27. At the output of demodulator 27 a measurement frequency voltage in the range between 2.6 and 3.5 Kc is once again obtained and is brought to a constant amplitude by means of converter 31, the output of which is thus transmitted to measurement station 2 via line 1. There, high-pass filter 19 allows it to pass on to the amplifier 20 and the measurement 21.

Since the opposite station 3 in all cases gives off voltages with a constant level, the reception voltages of the measurement station 3 are attenuated only by the amount of the frequency-dependent attenuation of line 1 in transmission direction B–A. The level of this attenuation in connection with the individual measurement frequencies can be read off directly at measurement instrument 21, but it can also be stored or it can be turned into a good/bad, go/no-go indication by means of automatic evaluation means, such as voltage discriminators.

Filters 17–19 are complementary to filters 13–15 and block precisely those frequencies which these filters let through. Thus, the transmission voltages cannot falsify the measurement result even if termination 16 has a very small transition attenuation or even if there is no termination at all.

If opposite station 3 does not have a termination or has only an incomplete termination 22, then there can be provided filters of the kind of filters 17–19 at the output of converter 31 which are connected by means of a further set of contacts d, e and f of switching member 26. Likewise, it is possible, at the place of termination 22, to use a frequency switch which is controlled by the converter 31 in such a manner that it will, when converter 31 is at rest, that is to say, when there is no input or output voltage at converter 31, allow passage and, as for the rest, will work in a frequency-dependent manner in accordance with filters 17–19.

What is claimed is:

1. In a method for measuring the frequency-dependent attenuation of a telecommunications line, especially a two-wire line, in at least one traffic direction (B–A) from one line end (A), the improvement comprising the steps of modulating a variable frequency measurement signal at the measurement station (2) with at least one carrier frequency ($f_1$ to $f_3$), transmitting the thus modulated signal via the line to be measured (1) to the opposite station (3), demodulating the modulated signal and converting the thus recovered demodulated signal into a constant-level A.C. signal of said variable frequency at the opposite station, and transmitting the constant-level A.C. signal of said variable frequency via the line to be measured (1) to the measurement station (2).

2. A method according to claim 1, wherein the frequency band of the measurement signal is subdivided into at least three ranges, each range having associated therewith a carrier frequency ($f_1$ to $f_3$) so far above or below the particular range that at least one side band of the modulation product will be outside the previously mentioned range.

3. A method according to claim 1 including selecting carrier frequencies ($f_1$ to $f_3$) in the measurement station (2) as a function of the frequency of the measurement signal.

4. A method according to claim 1 including selecting demodulator frequencies ($f_1$ to $f_3$) in the opposite station (3) as a function of the frequency of the reception signal.

5. A method according to claim 3 wherein the selection of the carrier and demodulator frequencies ($f_1$ to $f_3$) is made by controlling switching elements via logic connection circuits.

6. A method according to claim 1 further including the step of separating the transmission signal from the reception signal by frequency-dependent members as a function of the frequency of the measurement signal.

7. A method according to claim 4 wherein the selection of the carrier and demodulator frequencies ($f_1$ to $f_3$) is made by controlling switching elements via logic connection circuits.

8. A method according to claim 1 further including the step of separating the transmission signal from the reception signal at the opposite station as a function of the frequency of the reception signal.

9. A method according to claim 1 including blocking undesirable modulation products from the line (1).

* * * * *